(No Model.)
J. J. ROYLE.
PIPE COUPLING FOR DROP LIGHTS.
No. 286,229. Patented Oct. 9, 1883.
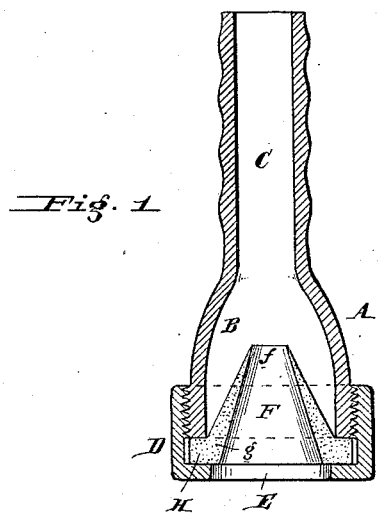
Fig. 1
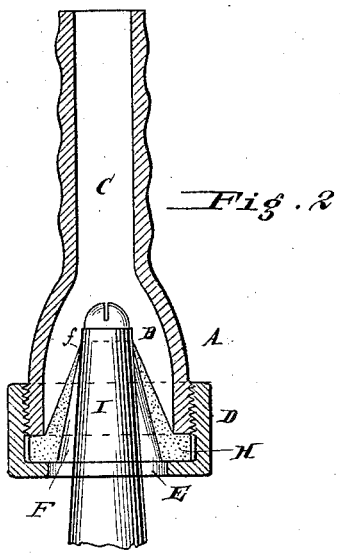
Fig. 2
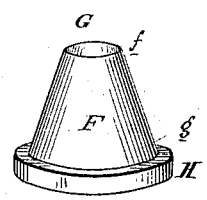
Fig. 3
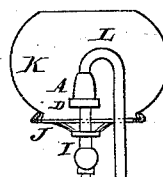
Fig. 4
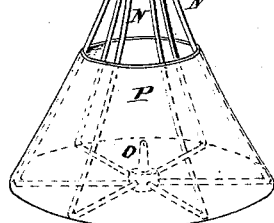
Fig. 5
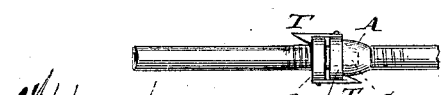
Attest
Chas. F. Opitz
W. S. McWade
Inventor
John J. Royle
By his atty

United States Patent Office.

JOHN J. ROYLE, OF MANCHESTER, COUNTY OF LANCASTER, ENGLAND.

PIPE-COUPLING FOR DROP-LIGHTS.

SPECIFICATION forming part of Letters Patent No. 286,229, dated October 9, 1883.

Application filed May 9, 1883. (No model.) Patented in England June 13, 1879, No. 2,350, and December 13, 1881, No. 5,446.

*To all whom it may concern:*

Be it known that I, JOHN J. ROYLE, of the city of Manchester, in the county of Lancaster, England, have invented an Improvement in Pipe-Couplings, of which the following is a specification.

My invention has reference to couplings in general, but more particularly adapted to drop-lights for illuminating purposes; and it consists in certain improvements fully set out in the following specification, and shown in the accompanying drawings, which form part thereof.

In the drawings, Figure 1 is a vertical section of my improved coupling. Fig. 2 is a similar view, showing the same in position on a gas-burner. Fig. 3 is a perspective view of the rubber removed from the casing. Fig. 4 shows the same applied to my improved drop-light, and Fig. 5 is an elevation showing the said coupling as adapted for coupling tubes or pipes together.

A is the coupling, and consists of an enlarged hollow body, B, having an outlet-tube, C, of any desired construction.

F is the rubber or flexible packing, and is formed with a cylindrical or tapering hole, G, the base of said packing being provided with a flange, H, and is made with thick walls $g$, which taper off to a fine or nearly fine edge, $f$, at the other end; hence the outer surface of the packing is made conical. This packing F is retained in place by means of a screw-cap, D, having a central orifice, E, the said cap being screwed to the body B, and clamping the flange H of the packing between it and said body.

When such a coupling is placed upon a gas-burner, I, the packing fits snugly to it, particularly at the thin end or edge $f$, and the pressure of the gas is sufficient to press said flexible packing tightly against said burner, thereby insuring a gas-tight joint without forcing the coupling down upon the burner with excessive pressure, as is required with couplings now in general use.

By the use of my coupling there is little or no jarring of the parts, and it can be coupled and uncoupled with the greatest possible ease and facility. When the packing wears out, the same may be replaced by a new one, as the cap D allows the ready removal of the old one and insertion of the new one.

The coupling may be connected to a flexible rubber tube, or to a metal pipe, as shown at M, in which case the bend L is made very short, so as to enable the coupling to be inserted through the opening at the bottom of the globe. The pipe M may be subdivided into small pipes N, which meet again at the bottom and terminate in the burner O. The shade P may be carried by said small pipes N in the manner shown.

It will be understood that the coupling hereinbefore set forth is equally adapted to water and liquid pipes generally, and in some instances it may be desired to couple two or more pipes together. In this latter case the end of one pipe is furnished with a coupling, A, and the end of the other pipe is furnished with a metal disk, R, having a nozzle or nose, S, which projects into the aperture G in the coupling-packing; and these two parts may be prevented from separating by means of spring-catches T, or other equivalent means, when liable to be pulled apart accidentally.

In cases where the air, gas, or liquid has but little pressure, the end or edge $f$ of the packing F should be made very flexible; but when considerable pressure is to be had the packing may be made more solid; but in any case the tapering of the body of the packing should be very decided, or under pressure the packing would be turned inside out.

I do not limit myself to the exact construction shown, as it may be modified in various ways without departing from my invention.

Having now described my invention, what I claim as new, and desire to secure by Letters Patent, is—

1. A coupling for pipes, &c., which consists of a case provided with a packing of flexible material, as rubber, the body of which is made conical or tapering, and terminating in a thin flexible edge within said case and free from contact with its sides, substantially as and for the purpose specified.

2. A coupling for pipes, &c., which consists of a case, in combination with a removable packing of flexible material, the body of which is made conical or tapering, being provided with a flange, and terminating in a thin flexible edge within said case and free from contact therewith, and a cap adapted to be secured to said case and hold the flange of said packing, substantially as and for the purpose specified.

3. The detachable packing for a coupling, consisting of the body F, made conical or tapering from $g$ to the edge $f$, having a conical aperture, and provided with a flange, H, substantially as and for the purpose specified.

4. The drop-light composed of pipe M, radiating-tubes N, which, after radiating, converge and center in a burner, O, a conical shade, P, which rests upon the tubes N, and is supported thereby, and a coupling at the top of said pipe M, substantially as and for the purpose specified.

In testimony of which invention I hereunto set my hand.

JOHN J. ROYLE.

Witnesses:
EDWARD JOYCE,
HENRY DAVIES.